(12) United States Patent
Kodihalli

(10) Patent No.: US 10,248,470 B2
(45) Date of Patent: Apr. 2, 2019

(54) HIERARCHICAL HARDWARE OBJECT MODEL LOCKING

(71) Applicant: International Business Machines Corporation, Armonk, NY (US)

(72) Inventor: Deepak Kodihalli, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 78 days.

(21) Appl. No.: 15/252,382

(22) Filed: Aug. 31, 2016

(65) Prior Publication Data
US 2018/0060141 A1    Mar. 1, 2018

(51) Int. Cl.
*G06F 9/46* (2006.01)
*G06F 9/52* (2006.01)

(52) U.S. Cl.
CPC ................... *G06F 9/526* (2013.01)

(58) Field of Classification Search
None
See application file for complete search history.

(56) References Cited

U.S. PATENT DOCUMENTS

| | | | | |
|---|---|---|---|---|
| 6,144,983 A * | 11/2000 | Klots | ........................ | G06F 9/52 707/999.008 |
| 8,468,169 B2 | 6/2013 | Ross et al. | | |
| 8,627,331 B1 * | 1/2014 | Grunwald | ........... | H04L 67/1087 718/106 |
| 8,788,530 B2 | 7/2014 | Lacapra et al. | | |
| 9,378,052 B1 * | 6/2016 | Dou | ........................ | G06F 9/526 |
| 9,575,985 B2 | 2/2017 | Dubey et al. | | |
| 9,740,582 B2 | 8/2017 | Eluri et al. | | |
| 9,870,369 B2 | 1/2018 | Whitehouse | | |
| 2003/0177443 A1 * | 9/2003 | Schnelle | ........... | G06F 17/30917 715/227 |
| 2004/0230903 A1 * | 11/2004 | Elza | ..................... | G06F 17/2241 715/234 |
| 2005/0041019 A1 * | 2/2005 | King | ..................... | G06F 3/0219 345/184 |
| 2005/0246469 A1 * | 11/2005 | Chu | ......................... | G06F 1/12 710/301 |
| 2006/0155905 A1 * | 7/2006 | Leino | ...................... | G06F 9/526 710/243 |
| 2008/0028266 A1 * | 1/2008 | Martens | .............. | G06F 11/2236 714/726 |

(Continued)

OTHER PUBLICATIONS

Bueso, Davidlohr, "acmqueue Scalability Techniques for Practical Synchronization Primitives", Designing locking primitives with performance in mind, © 2014 ACM 1542-7730/14/1100, 14 pages.

(Continued)

*Primary Examiner* — Adam Lee
(74) *Attorney, Agent, or Firm* — Edward J. Wixted, III (57) ABSTRACT

A method, executed by a computer, includes locking a system mutex of a system target, locking a node group with a single node group write-lock, wherein the node group comprises a plurality of nodes that are all locked by the single node group write-lock, and wherein each node of the plurality of nodes has a plurality of descendants, and locking the plurality of descendants corresponding to a node with a single node write-lock. A computer system and computer program product corresponding to the above method are also disclosed herein.

17 Claims, 5 Drawing Sheets

(56) References Cited

U.S. PATENT DOCUMENTS

| | | | | |
|---|---|---|---|---|
| 2010/0023519 | A1* | 1/2010 | Kailash | H04L 63/10 |
| | | | | 707/E17.007 |
| 2010/0122253 | A1* | 5/2010 | McCart | G06F 8/458 |
| | | | | 718/100 |
| 2011/0071993 | A1* | 3/2011 | Vasudevan | G06F 17/30362 |
| | | | | 707/704 |
| 2012/0170887 | A1* | 7/2012 | Yang | G02B 6/132 |
| | | | | 385/14 |
| 2013/0204902 | A1* | 8/2013 | Wang | G06F 17/30327 |
| | | | | 707/797 |
| 2014/0074841 | A1* | 3/2014 | Majnemer | G06F 17/30327 |
| | | | | 707/737 |
| 2014/0201163 | A1* | 7/2014 | Tipton | G06F 11/1004 |
| | | | | 707/686 |
| 2017/0124109 | A1* | 5/2017 | Curtis-Maury | G06F 17/30171 |
| 2017/0177617 | A1* | 6/2017 | Johnson | G06F 17/30227 |

OTHER PUBLICATIONS

Gray et al., "Granularity of Locks in a Shared Data Bse", IBM Research Laboratory, San Jose, California, printed on Jun. 30, 2016, 24 pages.

Suess, Michael, "10 Ways to Reduce Lock Contention in Threaded Programs", Thinking Parallel, A Blog on Paralle Programming and Concurrency, Jul. 3, 2007, 5 pages, <http://www.thinkingparallel.com/2007/07/31/10-ways-to-reduce-lock-contention-in-threaded-programs/>.

Unrau et al., "Experiences with Locking in a NUMA Multiprocessor Operating System Kernel", Department of Electrical and Computer Engineering, Department of Computer Science, University of Toronto, printed on Jun. 30, 2016, 19 pages.

"Multiple granularity locking", From Wikipedia, the free encyclopedia, page was last modified on May 20, 2015, 1 page, <https://en.wikipedia.org/wiki/Multiple_granularity_locking>.

* cited by examiner

HIERARCHICAL HARDWARE OBJECT MODEL LOCKING

BACKGROUND OF THE INVENTION

The present invention relates generally to hardware object models, and more specifically, to locking and unlocking hardware object models in a hierarchical fashion.

In the field of hardware object models, the various hardware components of a computing system are modeled in software so that firmware applications may have an interface to access the hardware components. When firmware is multithreaded, multiple threads may attempt to access the same hardware element, necessitating a serialization of the hardware via an access lock on the hardware's object model. In order to perform a lock on a particular hardware element, its sub-elements must also be locked. One problem with locking hardware object models is that a time delay is introduced when locking all of the elements in its hierarchical tree. Thus, a faster approach to hierarchical hardware object model locking is needed.

SUMMARY

As disclosed herein, a method, executed by a computer, includes locking a system mutex of a system target, locking a node group with a single node group write-lock, wherein the node group comprises a plurality of nodes that are all locked by the single node group write-lock, and wherein each node of the plurality of nodes has a plurality of descendants, and locking the plurality of descendants corresponding to a node with a single node write-lock. A computer system and computer program product corresponding to the above method are also disclosed herein.

DETAILED DESCRIPTION

Embodiments of the present invention relate generally to hardware object models, and more specifically, to locking and unlocking hardware object models in a hierarchical fashion. A hardware object model (HOM) is a software representation of computing hardware through which a firmware application may access the underlying hardware and avoid conflicts. When multiple firmware threads compete for access to a particular HOM, it is necessary to lock the HOM, which in turn, requires locking of any hardware that falls under the HOM's particular hierarchy, such as nodes, processors, memory, and the like. Due to the hierarchical nature of a HOM, locking or unlocking a HOM and its hierarchy may introduce a substantial delay for firmware access.

For example, in order to lock a system that has three nodes, all of which have three descendants, a total of thirteen lock operations must take place (one system lock, three node locks, and nine descendant locks). When the system is to be unlocked, another thirteen unlock operations would also be required. Embodiments of the present invention provide an alternative approach to hierarchical HOM locking by simultaneously locking entire tiers of a HOM's hierarchy in a single operation.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
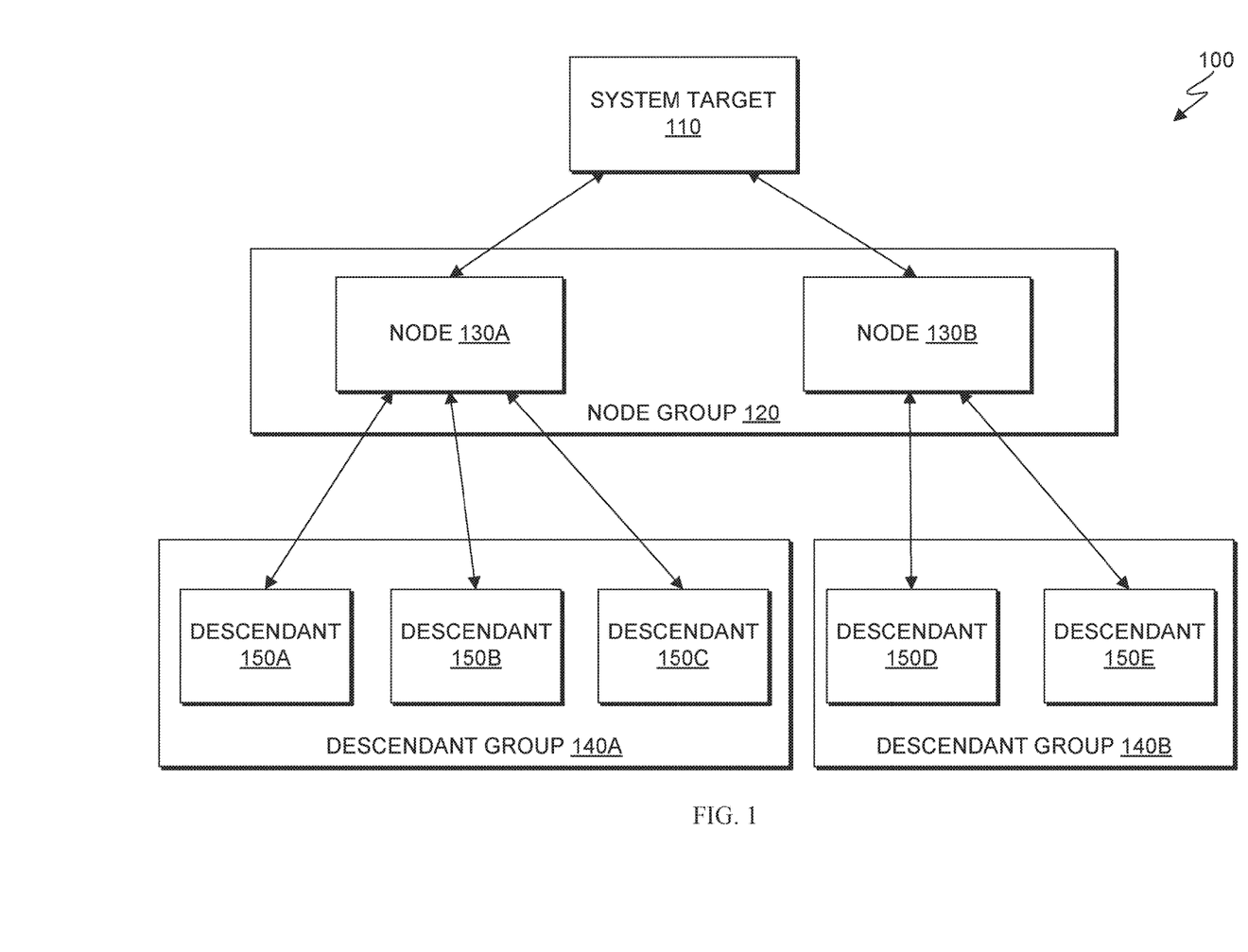
FIG. 1 is a block diagram depicting an example of a hierarchical HOM system in accordance with embodiments of the present invention.

FIG. 1 is a block diagram depicting an example of a hierarchical HOM system in accordance with embodiments of the present invention. As depicted, hierarchical HOM system 100 includes system target 110, node group 120, nodes 130A and 130B, descendant groups 140A and 140B, and descendants 150A-150E. Nodes may be grouped into one or more node groups, and similarly, descendants may be grouped into one or more descendant groups.

System target 110 may represent a system-level HOM, which is the highest tier of any hierarchy for a computing system. As the highest tier, all hardware of a computer must necessarily fall somewhere within the hierarchy of system target 110. Below system target 110 are nodes such as nodes 130A and 130B, and below nodes are descendants such as descendants 150A-150E. While two nodes and five descendants are depicted in the hierarchy of this system target 110, any number of nodes and descendants may be possible.

When system target 110's hierarchy is locked, nodes 130A-130B and descendants 150A-150E may be locked as well. Locking means applying a mutex to the item, which is an attribute that serializes access to the item. Embodiments of the subject invention speed up the locking of this hierarchy by applying a group lock to all of the nodes in a node group in a single operation, as well as a group lock to all of the descendants in a descendant group. For example, nodes 130A and 130B may be locked by a singular operation performed on node group 120. Similarly, descendants 150A-150C may be locked simultaneously by a lock operation performed on descendant group 140A, and descendants 150D-150E may be locked by an operation performed on descendant group 140B.

Nodes 130A and 130B may include any hardware element that is organized in a hierarchy such that it is immediately underneath the uppermost system-level. Nodes may serve as an organizational level under which related descendants may be grouped together. For example, node 130A may be a node for one group of processors, and node 130B may be a node for another group of processors. A node may include, but is not limited to, a service processor, system reference clock, system bus, PCI, PCI clock, Time of Day clock, power-management chip, thermal-management chip, NAND flash chip, NOR flash chip, and the like.

Descendants 150A-150E may include any hardware element that is organized beneath a node. A descendant may include, but is not limited to, a processor, a memory chip, a node controller, a memory buffer, a local clock, and the like. Furthermore, descendants may have their own children that share a relationship to descendants analogous to the relationship between descendants and nodes. Children of descendants may include L2 caches, L3 caches, cores, memory controllers, on-chip controllers, and the like.

Figure 2:
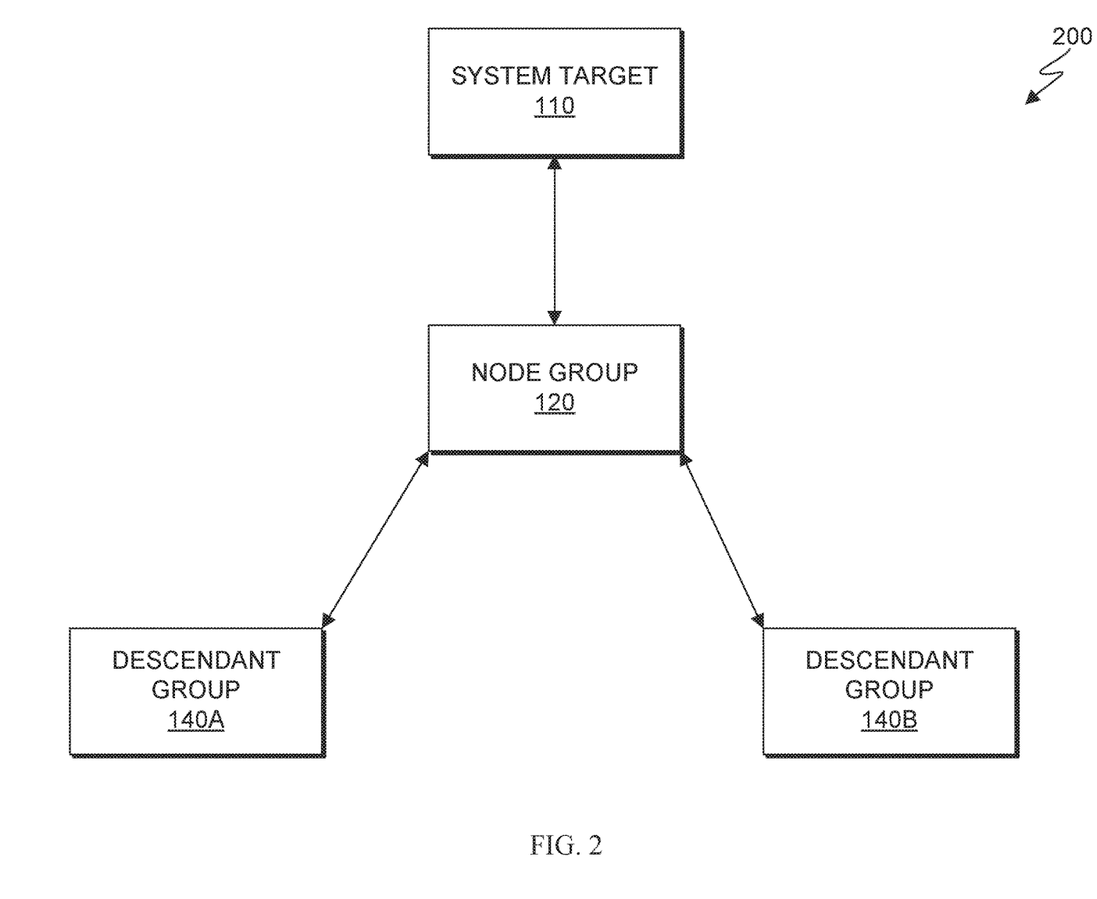
FIG. 2 is a block diagram depicting an example of a hierarchical HOM system in accordance with embodiments of the present invention.

FIG. 2 is a block diagram depicting an example of a hierarchical HOM system 200 in accordance with embodiments of the present invention. As depicted, hierarchical HOM system 200 includes system target 110, node group 120, and descendant groups 140A and 140B. hierarchical HOM system 200 may be considered to be an abstraction of hierarchical HOM system 100. Thus, hierarchical HOM system 200 may illustrate how, during locking/unlocking of system target 110, the nodes are treated as a single node group 120, and descendants treated as a single descendant group 140A or 140B.

Figure 3:
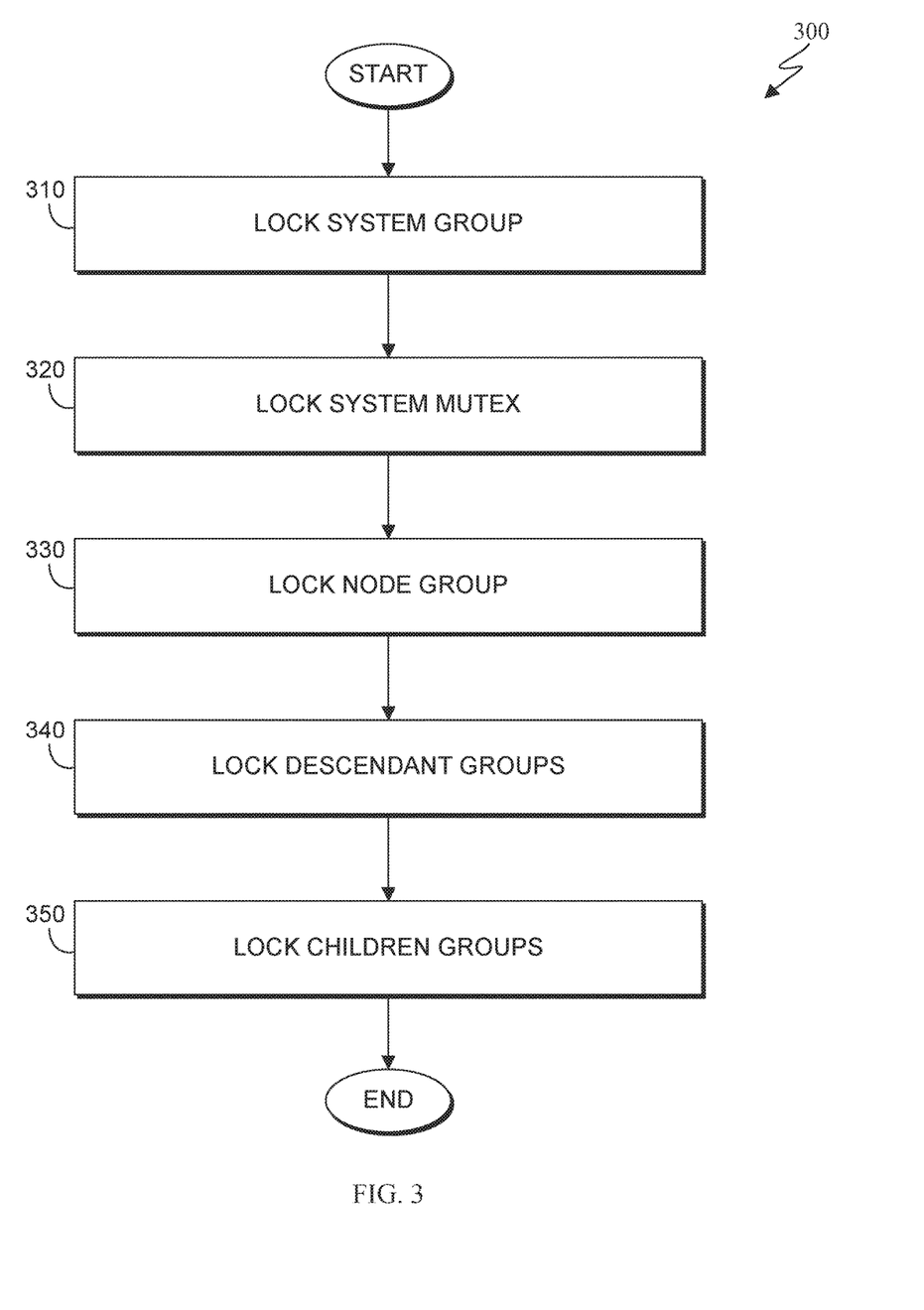
FIG. 3 is a flow chart depicting an example of a locking method in accordance with embodiments of the present invention.

FIG. 3 is a flow chart depicting an example of a locking method 300 in accordance with embodiments of the present invention. As depicted, locking method 300 includes locking (310) the system group, locking (320) the system mutex, locking (330) a node group, locking (340) descendant groups, and locking (350) children groups. Thus, locking method 300 locks hierarchical HOM system 100 in a top-down fashion, one tier at a time.

Locking (310) the system group may include receiving a request to lock system target 110, and applying a read-lock to system target 110 itself. The request to lock the system group may be received from a thread. In some embodiments, the system group is locked with a write lock, which is exclusive, meaning that if a thread holds a write-lock on the system group, no other thread may hold a write-lock (although other threads may be only to read from the locked HOMs). Locking (320) the system mutex, similarly, may include locking the system mutex for system target 110, which is an individual lock specific to system target 110. Locking (310) the system group and locking (320) the system mutex may be redundant operations, where locking (310) the system group is performed in order to maintain a consistent locking algorithm so that there is no need to perform a special determination of whether a target is a system target.

Locking (330) a node group may include simultaneously locking all nodes that are included in the node group with a single lock. The lock may be similar to a mutex for a single HOM, but instead of applying to one HOM, the lock locks all nodes in the node group. For example, locking node group 120 in FIG. 1 may lock both node 130A and node 130B at the same time with a single lock, rather than individually locking a mutex of node 130A and then a mutex of node 130B. Thus, in systems with hundreds of nodes, locking all of them at once may provide dramatic speed increases as compared to locking individual mutexes one at a time.

Locking (340) descendant groups may include simultaneously locking all elements that are included in a descendant group with a single lock. For example, locking descendant group 140A in FIG. 1 may lock descendants 150A-150C with a single lock. Descendant group locking operation 340 may proceed one at time through each descendant group (e.g., lock descendant group 140A, then descendant group 140B) until all descendant groups in a hierarchy are locked.

Locking (350) children groups may include locking any children of a descendant with a single group lock. Locking method 300 may proceed iteratively through sublevels until each tier of the hierarchy is locked in a systematic fashion.

Figure 4:
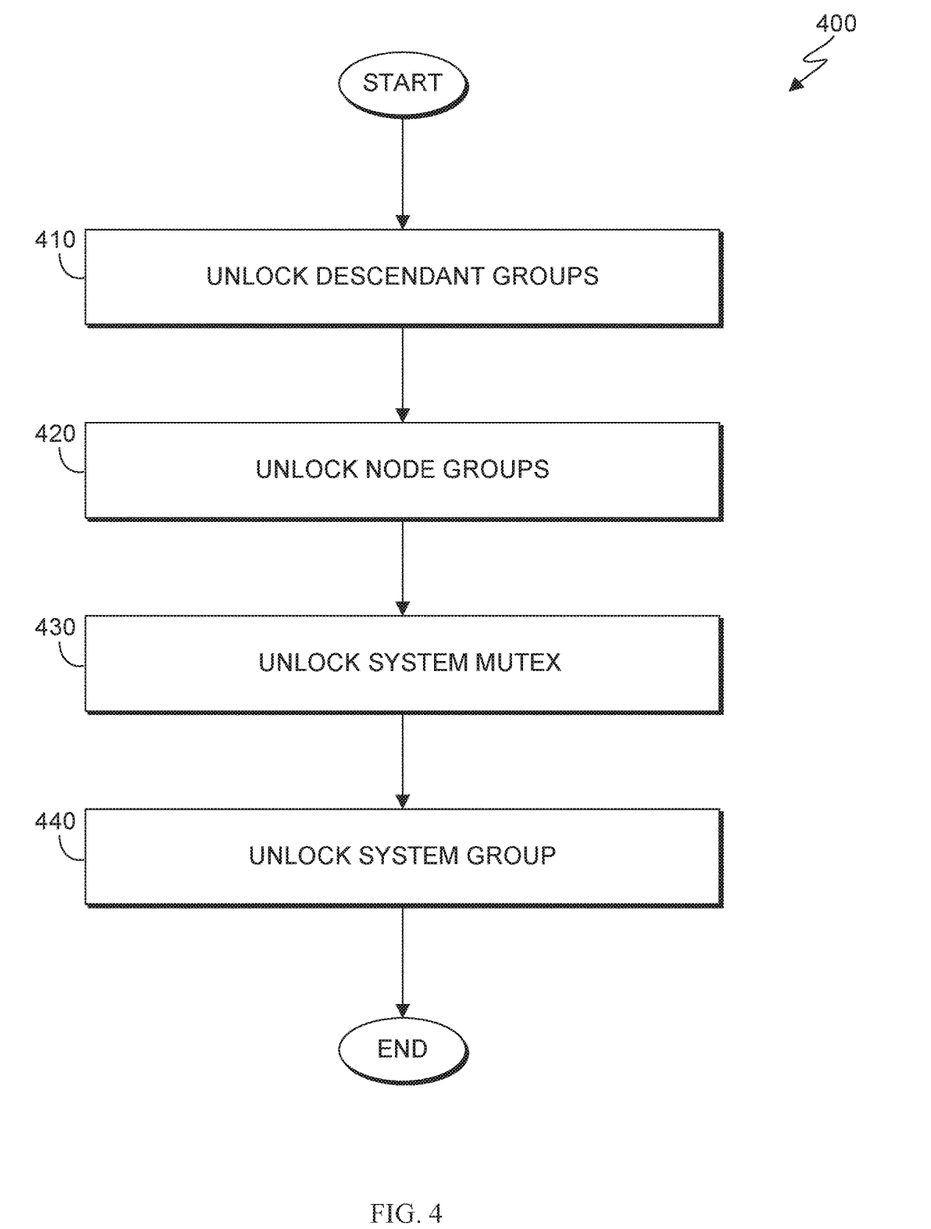
FIG. 4 is a flow chart depicting an example of an unlocking method in accordance with embodiments of the present invention.

In other embodiments, locking method 300 executes in a top-down fashion as explained above, but does not necessarily start at the system level. Locking method 300 may start at any level of the hierarchy and lock any children/children-of-children/etc. elements. Similarly, unlocking as described in unlocking method 400 below may proceed in the reverse, up to a particular element that may or may not be the top system-level.

FIG. 4 is a flow chart depicting an example of an unlocking method 400 in accordance with embodiments of the present invention. As depicted, unlocking method 400 includes unlocking (410) descendant groups, unlocking (420) node groups, unlocking (430) the system mutex, and unlocking (430) the system group. Unlocking method 400 proceeds in the reverse order of locking method 300 as it unlocks locket HOMs.

Unlocking (410) descendant groups includes unlocking each descendant group of hierarchical HOM system one at a time, until all descendant groups are unlocked. By unlocking (410) a descendant group, all member descendants are simultaneously unlocked. Descendant group unlocking operation 410 may proceed through each descendant group until all are unlocked before continuing to node group unlocking operation 420.

Unlocking (420) node groups may unlock nodes groups similarly to how unlocking (410) descendant groups unlocked descendant groups. Node group unlocking operation 420 may proceed through each node group until all nodes are unlocked, before continuing to system mutex unlocking operation 430.

Unlocking (430) the system mutex may include unlocking the mutex of system target 110, which may enable other firmware threads to read from and/or write to system target 110. Unlocking (440) the system group may remove a lock from system target 110, such as a read or write lock, enabling other firmware threads to read from and/or write to system target 110 and the rest of hierarchical HOM system 100. In some embodiments, unlocking (430) the system mutex and unlocking (440) the system group are redundant operations; the system group may be unlocked in order to simplify the algorithm (so that there is no special need to check whether a target is a system-level target).

Figure 5:
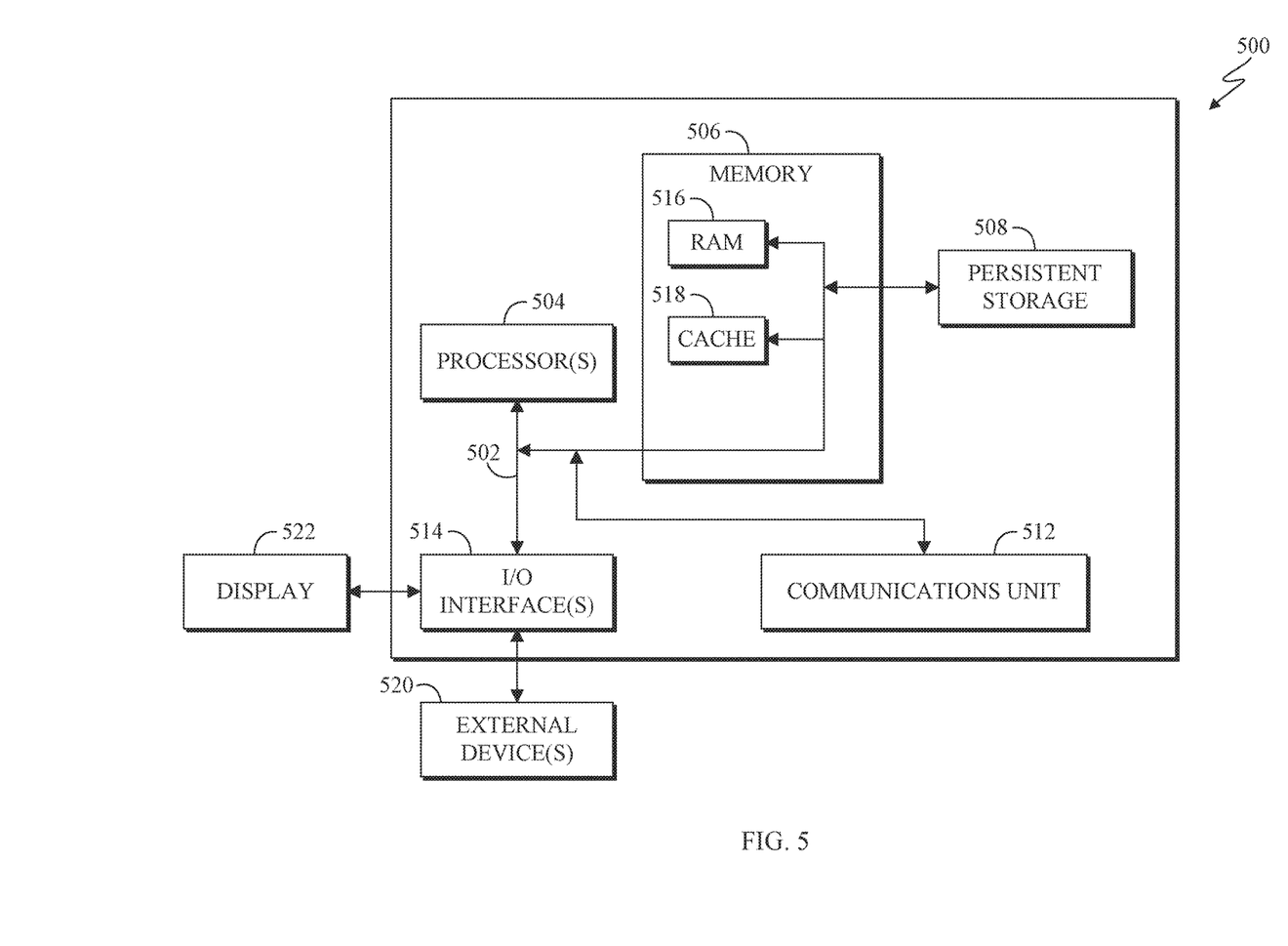
FIG. 5 is a block diagram depicting one example of a computing apparatus (i.e., computer) suitable for executing the methods disclosed herein.

FIG. 5 is a block diagram depicting components of a computer 500 suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 504 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 514. I/O interface(s) 514 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   locking a system mutex of a system target with a read-lock operation, wherein the system target comprises a node group comprising a plurality of nodes, wherein each node of the plurality of nodes comprises a descendant group, and wherein each descendant group comprises a plurality of descendants;
   subsequent to locking the system mutex, locking the node group with a first write-lock operation, wherein locking the node group comprises simultaneously locking all of the plurality of nodes of the node group with the first write-lock operation; and
   subsequent to locking the node group, sequentially locking the descendant group for each of the plurality of nodes with a second write-lock operation, wherein locking the descendant group of a particular node simultaneously locks all of the descendants of the respective descendant group, and wherein the first write-lock operation is different than the second write-lock operation.

2. The method of claim 1, further comprising:
   unlocking the plurality of descendants;
   unlocking the node group; and
   unlocking the system mutex.

3. The method of claim 1, wherein a node is selected from the list consisting of a service processor, a system reference clock, a system bus, a peripheral component interconnect (PCI), a PCI clock, a Time of Day clock, a power-management chip, a NAND flash chip, and a NOR flash chip.

4. The method of claim 1, wherein a descendant is selected from the list consisting of a processor, a memory chip, a node controller, a memory buffer, and a local clock.

5. The method of claim 1, further comprising:
   locking a plurality of children of each of the plurality of descendants with a single child-of-descendant lock.

6. The method of claim 5, wherein a child of a descendant is selected from the list consisting of an L2 cache, an L3 cache, a core, a memory controller, and an on-chip controller.

7. A computer system comprising:
   one or more computer processors;
   one or more computer readable storage media;
   program instructions stored therein for execution by at least one of the one or more computer processors, the program instructions comprising instructions for executing the method of claim 1.

8. The computer system of claim 7, further comprising instructions for:
   unlocking the plurality of descendants;
   unlocking the node group; and
   unlocking the system mutex.

9. The computer system of claim 7, wherein a node is selected from the list consisting of a system reference clock, a system bus, a peripheral component interconnect (PCI), a PCI clock, a Time of Day clock, a power-management chip, a NAND flash chip, and a NOR flash chip.

10. The computer system of claim 7, wherein a descendant is selected from the list consisting of a memory chip, a node controller, a memory buffer, and a local clock.

11. The computer system of claim 7, further comprising instructions for:
    locking a plurality of children of each of the plurality of descendants with a single child-of-descendant lock.

12. The computer system of claim 11, wherein a child of a descendant is selected from the list consisting of an L2 cache, an L3 cache, a core, a memory controller, and an on-chip controller.

13. A computer program product comprising:
    a computer readable storage medium and program instructions stored on the computer readable storage medium, the program instructions comprising instructions for executing the method of claim 1.

14. The computer program product of claim 13 further comprising instructions for:
   unlocking the plurality of descendants;
   unlocking the node group; and
   unlocking the system mutex.

15. The computer program product of claim 13, wherein a node is selected from the list consisting of a service processor, a system reference clock, a system bus, a peripheral component interconnect (PCI), PCI clock, a Time of Day clock, a power-management chip, a NAND flash chip, and a NOR flash chip.

16. The computer program product of claim 13, wherein a descendant is selected from the list consisting of a processor, a memory chip, a node controller, a memory buffer, and a local clock.

17. The computer program product of claim 13, further comprising instructions for:
   locking a plurality of children of each of the plurality of descendants with a single child-of-descendant lock.

* * * * *